US005234746A

United States Patent [19]

Iwamoto et al.

[11] Patent Number: 5,234,746

[45] Date of Patent: Aug. 10, 1993

[54] CONDUCTIVE SUBSTRATE AND PRINTING MEDIA USING THE SAME

[75] Inventors: Kiyoshi Iwamoto; Tomio Oki; Keno Kamimura, all of Shizuoka, Japan

[73] Assignee: Tomoegawa Paper Co., Ltd., Tokyo, Japan

[21] Appl. No.: 700,809

[22] Filed: May 16, 1991

[30] Foreign Application Priority Data

May 16, 1990 [JP] Japan .................................. 2-124155
Aug. 10, 1990 [JP] Japan .................................. 2-210468
Dec. 27, 1990 [JP] Japan .................................. 2-415241

[51] Int. Cl.$^5$ ............................ G03G 5/14; B32B 9/00

[52] U.S. Cl. .................................... 428/209; 428/704; 428/325; 528/500

[58] Field of Search ................ 528/500, 522; 428/325, 428/704

[56] References Cited

FOREIGN PATENT DOCUMENTS 0011486 5/1980 European Pat. Off. .
2551018 8/1976 Fed. Rep. of Germany .
2029625 10/1970 France .
2079010 11/1971 France .
2239557 2/1975 France .
61-26435 11/1986 Japan .
63-318568 6/1987 Japan .
1248158 12/1988 Japan .
62131265 10/1989 Japan .

OTHER PUBLICATIONS

"Crosslinkable Conductive Polymers," Research Disclosure, vol. 2244, No. 164, Dec. 1977, pp. 72-73, Chang et al.

*Primary Examiner*—Patrick J. Ryan
*Assistant Examiner*—Cathy Lee
*Attorney, Agent, or Firm*—Finnegan, Henderson, Farabow, Garrett & Dunner

[57] ABSTRACT

A conductive substrate and electrostatic recording media which incorporates such a conductive substrate are disclosed. The disclosed conductive substrate and recording media are applicable to electrostatic recording processes, electrophotographic printing processes and the like, and demonstrate excellent resistance to damage by water and other environmental factors. The conductive substrate of the present invention includes a substrate layer with at least one surface thereof having a conductive layer formed thereover. The above mentioned conductive layer has as a principle component an acryl type copolymer formed from polymerizable vinyl monomer of the type shown in chemical structural diagram 1 below in an amount of 10 to 45% by weight of the acryl type copolymer, and at least one other type of polymerizable vinyl monomer,

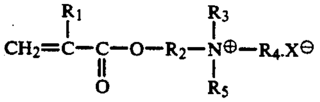

(1)

such that in chemical structural diagram 1, $R_1$ represents a hydrogen atom or a methyl group, $R_2$ represents an alkylene group, $R_3$, $R_4$ and $R_5$ represent benzyl groups or one to four carbon atom alkyl groups, and X represents chlorine, bromine, $CH_3SO_4$ or $C_2H_5SO_4$.

16 Claims, 2 Drawing Sheets

CONDUCTIVE SUBSTRATE AND PRINTING MEDIA USING THE SAME

BACKGROUND OF THE INVENTION

1. Field of the Invention

The present invention pertains to conductive substrates applicable to recording processes, and more particularly, to conductive substrates for which the conductive layer thereof exhibits enduring conductive characteristics and excellent resistance to water.

2. Prior Art

Conductive substrates are conventionally used for supporting the image recording layer in electrostatic recording media, photosensitive media used for electrophotography, and other types of printing and copying media.

Electrostatic copying and printing methods which employ media incorporating a conductive substrate and devices which employ such methods have enjoyed widespread popularity, including facsimile devices, printing and reproduction devices for mechanical drawings, schematic diagrams, etc., devices for printing proofsheets for use in proofreading for newspapers and other publications, and devices for copying official documents and the like. Furthermore, in recent years, refinements in electrostatic copying and printing methods have made production of multicolor copies and prints possible, which has been put to use for diverse applications including the field of design in general, as well as for production of advertisement and promotional fliers, programs for plays, sporting events and the like, and various other applications.

As a consequence of the growing popularity of electrostatic recording and copying methods, there is an intense demand for media applicable to such applications, which can be used for outdoor applications, and which therefore is capable of withstanding exposure to water and other environmental factors, while retaining a legible and attractive image despite such exposure. Unfortunately, in comparison with the rapid progress seen for electrostatic printing technology in general, development of electrostatic recording media which faithfully retain an image or text imparted thereto for an extended period of time, and which demonstrate enhanced resistance to material and image deterioration due to exposure to water and other environmental factors has lagged significantly behind.

In response to the need for water resistant electrostatic recording media, various attempts to provide therefor have been made, for example, by applying a conductive layer over a substrate made of paper, resin film, cloth and the like which has been previously treated so as to impart water resistance thereto, where the conductive layer is one such as that disclosed in Japanese Patent Application, First Publication No. Sho-61-264345. In the above cited reference, for the conductive component of the conductive layer, a cationic high molecular weight electrolyte material containing amine group was used. For the electrostatic recording medium thus produced, the electrical resistance characteristics were found to be stable over a wide range of conditions, with little variation thereof resulting from changes in the relative humidity. Consequently, in terms of humidity dependent characteristics, the electrostatic recording medium prepared as described above was found to be satisfactory. Unfortunately, due to the fact that the employed electrolyte material containing amine group is water soluble, exposure to rain or moisture resulted in solublization thereof, with subsequent peeling of the conductive layer, and hence, of the electrostatically printed image. As a result, this electrostatic recording medium was found to be unsuitable for outdoor applications.

Thus, despite an ongoing effort to develop electrostatic recording media applicable to outdoor applications, it has not as yet been possible to produce such media, that ia, it has not yet been possible to produce electrostatic recording media which can faithfully retain an image or text imparted thereto over an extended period of time, and which demonstrate significant resistance to material and image deterioration due to exposure to water and other environmental factors.

SUMMARY OF THE INVENTION

In consideration of the above, it is an object of the present invention to provide a conductive substrate which can be used in electrostatic recording media applicable to the production of high quality, enduring electrostatically printed images and text, and which demonstrates enhanced water resistance. It is also an object of the present invention to provide an improved electrostatic recording medium which incorporates such a conductive substrate.

So as to achieve the above described object, the present invention provides a conductive substrate including a substrate layer with at least one surface thereof having a conductive layer formed thereover, the conductive layer having as a principle component thereof an acryl type copolymer formed from polymerizable vinyl monomer of the type shown in chemical structural diagram 1 below in an amount of 10 to 45% by weight of the acryl type copolymer, and at least one other type of polymerizable vinyl monomer,

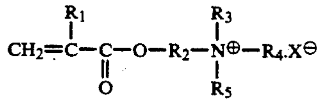

(1)

such that in chemical structural diagram 1, $R_1$ represents a hydrogen atom or methyl group, $R_2$ represents an alkylene group, $R_3$, $R_4$ and $R_5$ represent benzyl groups or one to four carbon atom alkyl groups, and X represents chlorine, bromine, $CH_3SO_4$ or $C_2H_5SO_4$.

Additionally, the present invention provides an electrostatic recording medium including a substrate layer with at least one surface thereof having a conductive layer and an image recording layer successively formed thereover, the conductive layer having as a principle component thereof an acryl type copolymer formed from polymerizable vinyl monomer of the type shown in chemical structural diagram 1 above in an amount of 10 to 45% by weight, and at least one other type of polymerizable vinyl monomer.

In accordance with the object of the present invention, the conductive substrate described above and electrostatic recording media incorporating such a conductive substrate make it possible to create high quality, durable and long lasting electrostatically printed images and text, which demonstrate exceptional resistance to damage from water and moisture and other environmental factors over a prolonged period of time.

DETAILED DESCRIPTION OF THE PREFERRED EMBODIMENTS

In the following, the preferred embodiments of the present invention will be described with reference to the drawings.

Figure 1:
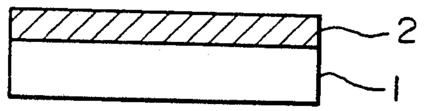
FIGS. 1 through 4 are cross-sectional views demonstrating the stratified structure of conductive substrates in accordance with the present invention.
Figure 2:
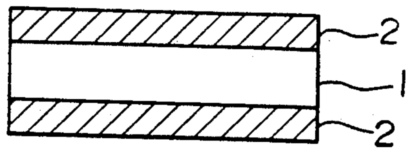
Figure 3:
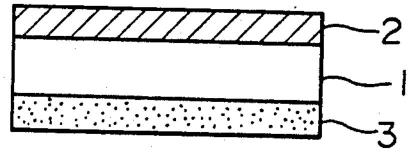
Figure 4:
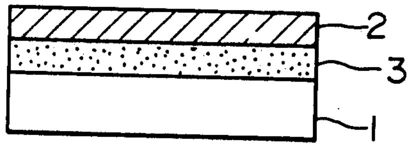

FIGS. 1 and 2 show the structure of a first and second example of the conductive substrate in accordance with the present invention. With the first example as shown in FIG. 1, the conductive substrate is seen consisting of a substrate layer 1 with an overlying first conductive layer 2 which incorporates a copolymer material characteristic of the present invention. FIG. 2 shows the second example of a conductive substrate which has two first conductive layers 2, one on either side surface of the intermediate substrate layer 1. FIG. 3 shows a third example of a conductive substrate which has a conductive layer 2 similar to that in the conductive substrates shown in FIGS. 1 and 2 which is formed on one surface of the substrate layer 1, whereas on the other surface of the substrate layer, an electronic conductive layer 3 is formed consisting of electronic conductive particulate material and binding resin. With the case of the fourth example of a conductive substrate as shown in FIG. 4, an electronic conductive layer 3 consisting of electronic conductive particulate material and binding resin is formed over one surface of the substrate layer 1 and a conductive layer 2 is formed over the electronic conductive layer 3, the conductive layer 2 being essentially identical to the conductive layer 2 shown in FIGS. 1 and 2.

Figure 5:
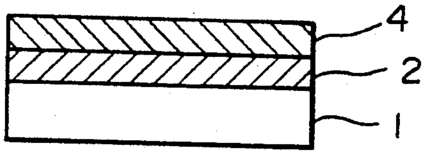
FIGS. 5 through 8 are cross-sectional views demonstrating the stratified structure of recording media in accordance with the present invention.
Figure 6:
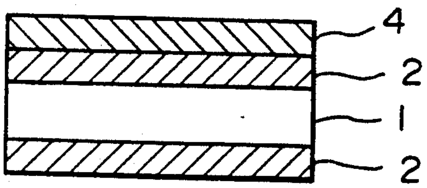
Figure 7:
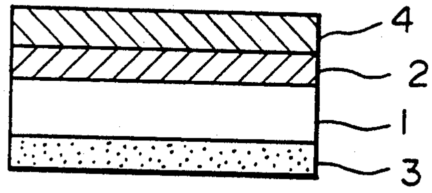
Figure 8:
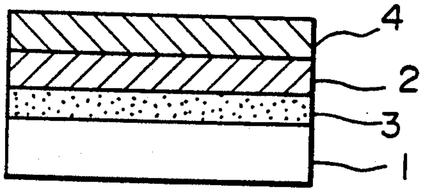

With a first example of an electrostatic recording medium in accordance with the present invention as shown in FIG. 5, an image recording layer 4 is applied over the conductive layer 2 of the conductive substrate shown in FIG. 1. With a second example of an electrostatic recording medium as shown in FIG. 6, an image recording layer 4 is applied over one, or optionally both of the first conductive layers 2 of the conductive substrate shown in FIG. 2. In the case of the electrostatic recording media shown in FIGS. 7 and 8, the image recording layer 4 is formed over the conductive layer 2 of the conductive substrates shown in FIGS. 3 and 4, respectively.

Now the material composition of the conductive substrates and recording media of the present invention will be described. As previously described, for the above mentioned first conductive layer 2, the principle component thereof is an acryl type copolymer formed from polymerizable vinyl monomer of the type shown in chemical structural diagram 1 below in an amount of 10 to 45% by weight, and at least one other type of polymerizable vinyl monomer.

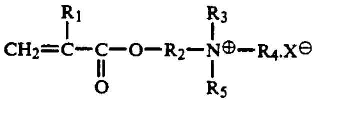
(1)

In chemical structural diagram 1 above, $R_1$ represents a hydrogen atom or methyl group, $R_2$ represents an alkylene group, $R_3$, $R_4$ and $R_5$ represent benzyl groups or one to four carbon atom alkyl groups, and X represents chlorine, bromine, $CH_3SO_4$ or $C_2H_5SO_4$.

Suitable examples of the polymerizable vinyl monomer shown in chemical structural diagram 1 include quartenary ammonium salts of aminoalkyl (meth)acrylates prepared by reacting dialkylaminoalkyl (meth)acrylates such as dimethylaminoethyl (meth)acrylate, diethylaminoethyl (meth)acrylate, dimethylaminopropyl (meth)acrylate or diethylaminopropyl (meth)acrylate with an alkylating agent such as methyl chloride, ethyl chloride, benzyl chloride, methyl bromide, ethyl bromide, dimethyl sulfate or diethyl sulfate.

For the other type of polymerizable vinyl monomer which together with the above described aminoalkyl (meth)acrylate quartenary ammonium salts form the acryl type copolymer of the present invention, suitable examples include, but are not limited to, alkyl (meth)acrylates such as methyl (meth)acrylate, ethyl (meth)acrylate, iso butyl (meth)acrylate, n-butyl (meth)acrylate, 2-ethylbenzyl (meth)acrylate, methyl (meth)acrylate, hexyl (meth)acryl amide; acrylonitrile; vinyl acetate; styrene; a-methyl styrene; and vinyl toluene.

As previously stated, the principle component of first conductive layer 2 is an acryl type copolymer which is formed using conventional copolymerization techniques from polymerizable vinyl monomer of the type shown in chemical structural diagram 1 in an amount of 10 to 45% by weight, and at least one other type of polymerizable vinyl monomer. More preferably, the polymerizable vinyl monomer of the type shown in chemical structural diagram 1 is employed in an amount of 25 to 40% by weight of the acryl type copolymer. If this polymerizable vinyl monomer is used in an amount greater than 45 weight %, the water resistance properties of the resulting conductive substrate and electrostatic recording medium decline to an insufficient level, and printed images and text made therefrom tend to suffer damage when exposed to moisture. On the other hand, if the vinyl monomer is used in an amount less than 10 weight %, the electrical resistance of a conductive substrate becomes too high, resulting in poor recording characteristics such as insufficient darkness or density of printed text.

When necessary, conductive materials can be added to the above described first conductive layer 2, wherein the acryl type copolymer functions as a binding resin. Examples of such conductive materials include carbon black, graphite, tin oxide, titanium oxide, zinc oxide, antimony oxide, gold, silver and copper and nickel in powdered form, cationic or anionic high molecular weight electrolyte substances, and conductive whiskers. Furthermore, inorganic pigments such as silica, aluminum hydroxide, aluminum oxide, kaolin, talc, mica, calcium carbonate, and organic pigments such as cellulose powder, polyethylene powder, polypropylene powder, as well as acryl type resins, styrene type resins and polyester type resins can be added to the conductive layer 2 of the present invention. Ideally, the surface electrical resistance of the conductive layer 2 should be on the order of from $1\times10^5$ to $1\times10^9\ \Omega$.

When it is desirable to include conductive whiskers in the conductive layer 2, conductive materials having a crystalline structure and which are in the form of small needles, fibers or the like can be used therefor. Such conductive whiskers can be used in a relatively small amount compared with conventional conduction enhancing materials. Suitable examples of materials for the conductive whiskers include whiskers made of potassium titanate, silicon carbonate, or aluminum borate which has been doped with tin oxide, antimony oxide, gold, silver or the like. Generally, materials for the conductive whiskers should be colorless or white so as to avoid imparting color to recording media incorporating the conductive substrate, for which reason alkali metal titanate (for example potassium titanate) most preferred. As for size of the conductive whiskers, a length of 0.5 to 100 μm and a diameter of 0.1 to 1 μm are preferred in order to provide a homogeneous first conductive layer 2. Conductive whiskers having a relatively low longitudinal resistance of $1\times10^4$ Ω cm or less generally provide the best results.

When conductive whiskers are added, the optimum proportion is within the range of 15 to 150 parts by weight of conductive whiskers to 100 parts by weight of acryl type copolymer. Because, when used under 15 parts by weight of the whiskers, preferable effect of adding the whiskers cannot be obtained, and when used over 100 parts by weight of the whiskers, resistance of the conductive layer in high humidity becomes unpreferable one. That is, when used outside of the range above, the variation in resistance of the conductive layer 2 with changes in humidity becomes too great, and as a result, printing density tends to be uneven and difficult to control.

As mentioned previously, an electronic conductive layer 3 consisting of electronic conductive particulate material and binding resin is included in the third and fourth examples of the conductive substrate and the seventh and eighth examples of the recording media of the present invention. For the electronic conductive particulate material of the electronic conductive layer 3, suitable examples include carbon black, tin oxide, gold or silver in powdered form; metals oxides such as zinc oxide or indium oxide which have been doped with antimony oxide or tin oxide; and conductive whiskers consisting of fine needles of potassium titanate, silicon carbide, aluminum borate and the like doped with antimony oxide or tin oxide. Suitable materials for the binding resin include polyesters, polycarbonates, polyamide, polyurethane, (meth)acrylate resins, styrene resins, butyral resins, fluorocarbon resins and the like.

It is generally preferable to come 20 to 500 parts by weight of the above described electronic conductive particulate materials with 100 parts by weight of binding resin. When used outside of this range, the variation in resistance of the electronic conductive layer 3 with changes in humidity becomes too great, and as a result, printing density tends to be uneven and difficult to control. Ideally, the surface electrical resistance of the conductive layer 2 should be on the order of from $1\times10^5$ to $1\times10^9$ Ω.

For the substrate layer 1 employed in the conductive substrate of the present invention, suitable materials include, but are not limited to, paper, synthetic paper, fabrics, unwoven cloth, numerous types of resin film and animal skins. In the case of outdoor applications, the substrate layer I should preferably be made from resin film, fabrics, or from paper which has been coated or impregnated with synthetic resin.

With the conductive substrates of the present invention, a conductive layer 2 or 3 is applied over at least one of the surfaces of the substrate layer I. And in the case of the recording media of the present invention, an image recording layer 4 is applied over one or both of the surface of the conductive layer 2 of the conductive substrate. Suitable materials for the image recording layer in the case of electrostatic recording media include various types of organic solvent soluble high resistance resin compounds which function as a dielectric layer, for example, polyester, polycarbonate, polyamide, polyurethane, (meth)acrylate resins, styrene resins, butyral resins, olefin resins, silicon resin, fluorocarbon resins. Additionally, inorganic and organic pigments such as those described in connection with conductive layer 2 can be added as needed. When the recording media of the present invention is to be used in electrophotography applications, the image recording layer should include a material which is photoconductive such as zinc oxide, dispersed in binding resin.

The components making up conductive layers 2 and 3 of the present invention can be dissolved and/or dispersed in a solvent such as water, methanol, ethanol, toluene, acetone, methylethyl ketone or ethyl acetate, the applied over the underlying layer by a technique such as air-knife coating, roll coating, wire-bar coating, spray coating, fountain coating, reverse-roll coating and the like, followed by drying.

As necessary, a barrier layer can be applied over one or both surfaces of the substrate layer before applying any subsequent layers. Suitable constituents thereof include, but are not limited to, various resin emulsions such as styrene-butadiene copolymer resin, acrylate-acrylic acid copolymer, styren-acryl copolymer, vinyl acetate-acryl copolymer, vinyl chloride, vinyl chloride-vinylacetate copolymer. Also, organic or inorganic pigments can be incorporated in such a barrier layer when desired.

EXAMPLES

In the following, various concrete examples of the conductive substrate and recording media of the present invention will be described in detail.

EXAMPLE 1

In a first example, using 50 g/m² wood free paper as the substrate layer, a conductive layer was applied over one surface thereof at 5 g/m² as a solution prepared by dissolving 30 parts of an acryl type copolymer in 70 parts of a 50/50 mixture of methanol/methylethyl ketone, the acryl type copolymer consisting of 40 parts by weight of the quartenary ammonium salt:

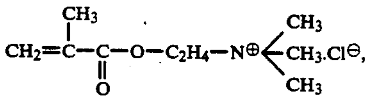

30 parts by weight of methyl methacrylate and 30 parts by weight of n-butyl methacrylate.

EXAMPLE 2

In the second example, the procedure of the first example was repeated, except that the acryl type copolymer consisted of 30 parts by weight of the quartenary ammonium salt, 35 parts by weight of methyl methacrylate and 35 parts by weight of n-butyl methacrylate.

EXAMPLES 3-6

In Examples 3 through 6, the procedure of the first example was repeated, except that the quaternary ammonium salt component of the acryl type copolymer was replaced with one of the following four quaternary ammonium salts:

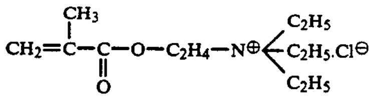
(example 3)

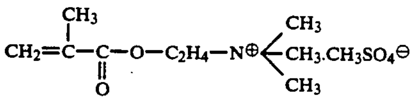
(example 4)

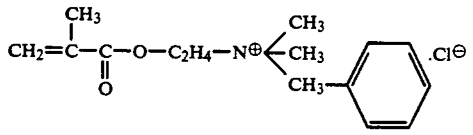
(example 5)

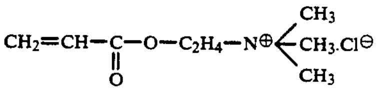
(example 6)

EXAMPLE 7

In Example 7, 20 parts of the acryl type copolymer consisting of 40 parts by weight of the quaternary ammonium salt:

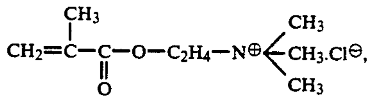

30 parts by weight of methyl methacrylate and 30 parts by weight of n-butyl methacrylate, blended with 10 parts of calcium carbonate was dispersed in 70 parts of a 50/50 mixture of methanol/methylethyl ketone. The resulting suspension was then applied over a paper substrate layer identical to that of Example 1, in an amount of 7 g/$m^2$.

EXAMPLE 8

In Example 8, the procedure of the Example 1 was repeated, except that the acryl type copolymer consisted of 10 parts by weight of the quaternary ammonium salt, 45 parts by weight of methyl methacrylate and 45 parts by weight of n-butyl methacrylate.

EXAMPLE 9

In Example 9, 20 parts of the acryl type copolymer consisting of 10 parts by weight of the quaternary ammonium

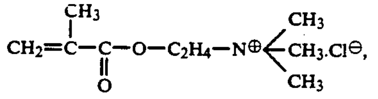

45 parts by weight of methyl methacrylate and 45 parts by weight of n-butyl methacrylate, blended with 10 parts of conductive zinc oxide (HakuSui Chemical Corporation, 23-K), was dispersed in 70 parts of a 50/50 mixture of methanol/methylethyl ketone. The resulting suspension was then applied over a paper substrate layer identical to that of Example 1, in an amount of 6 g/$m^2$.

EXAMPLE 10

Example 10, using 50 g/$m^2$ high quality paper as the substrate layer, a conductive layer was applied over one surface thereof at 5 g/$m^2$ as a dispersion prepared by mixing 21 parts of an acryl type copolymer and 9 parts of conductive potassium titanate whiskers (Otsuka Chemical Industries, Dentall WK-300) with 70 parts of a 50/50 mixture of methanol/methylethyl ketone, then dried, the acryl type copolymer consisting of 40 parts by weight of the quaternary ammonium salt:

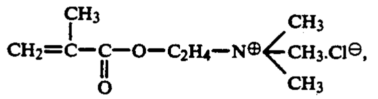

30 parts by weight of methyl methacrylate and 30 parts by weight of n-butyl methacrylate.

EXAMPLE 11

In Example 11, the procedure of Example 10 was repeated, except that the acryl type copolymer consisted of 30 parts by weight of the quaternary ammonium salt:

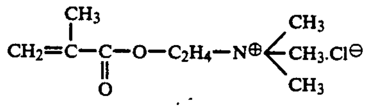

35 parts by weight of methyl methacrylate and 35 parts by weight of n-butyl methacrylate.

EXAMPLES 12-15

In Examples 12 through 15, the procedure of Example 10 was repeated, except that the quaternary ammonium salt of the acryl type copolymer was replaced with one of the following four quaternary ammonium salts:

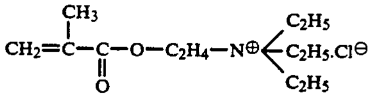
(example 12)

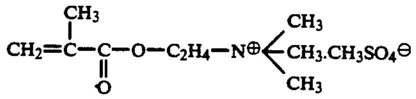
(example 13)

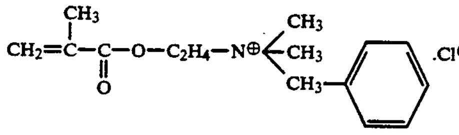
(example 14)

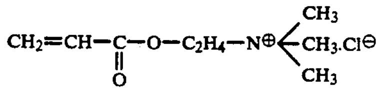
(example 15)

EXAMPLE 16

In Example 16, a conductive layer was applied over one surface of a paper substrate layer identical to that of Example 10 at 8 $g/m^2$ as a dispersion prepared by mixing 25 parts of an acryl type copolymer and 5 parts of conductive potassium titanate whiskers (Otsuka Chemical Industries, Dentall WK-300) with 70 parts of a 50/50 mixture of methanol/methylethyl ketone, then dried, the acryl type copolymer consisting of 40 parts by weight of the quartenary ammonium salt:

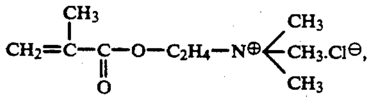

30 parts by weight of methyl methacrylate and 30 parts by weight of n-butyl methacrylate.

EXAMPLE 17

Example 17, a conductive layer was applied over one surface of a paper substrate layer identical to that of Example 10 at 6 $g/m^2$ as a dispersion prepared by mixing 12 parts of an acryl type copolymer and 18 parts of conductive potassium titanate whiskers (Otsuka Chemical Industries, Dentall WK-300) with 70 parts of a 50/50 mixture of methanol/methylethyl ketone, then dried, the acryl type copolymer consisting of 10 parts by weight of the quartenary ammonium salt:

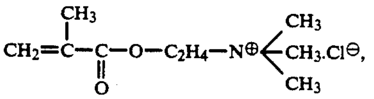

45 parts by weight of methyl methacrylate and 45 parts by weight of n-butyl methacrylate.

EXAMPLE 18

Using the conductive substrate prepared in Example 1 (as shown in FIG. 1), the uncoated surface of the substrate layer thereof was coated with 5 $g/m^2$ of a dispersion consisting of 50 parts of conductive potassium titanate whiskers (Otsuka Chemical Industries, Dentall WK-300), 125 parts of polyester resin (Toyo Textiles, Vyron 240) and 75 parts of methylethyl ketone (FIG. 3).

EXAMPLE 19

The procedure of Example 18 was repeated, except the uncoated surface of the substrate layer was coated with 5 $g/m^2$ of a dispersion consisting of 70 parts of conductive zinc oxide (HakuSui Chemical Corporation, 23-K), 75 parts of polyester resin (Toyo Textiles, Vyron 240), 55 parts of toluene and 50 parts of methylethyl ketone.

EXAMPLE 20

Using the conductive substrate prepared in Example 1 (as shown in FIG. 1), the conductive layer applied in that example was then covered with the electronic conductive layer at 5 $g/m^2$, consisting of a dispersion consisting of 50 parts of conductive potassium titanate whiskers (Otsuka Chemical Industries, Dentall WK-300), 125 parts of polyester resin (Toyo Textiles, Vyron 240) and 75 parts of methylethyl ketone (FIG. 4).

COMPARATIVE EXAMPLE 1

The procedure of Example 1 was repeated, except that the acryl type copolymer consisted of 5 parts of the quartenary ammonium salt, 50 parts of methyl methacrylate and 45 parts of n-butyl methacrylate.

COMPARATIVE EXAMPLE 2

The procedure of Example 1 was repeated, except that the acryl type copolymer consisted of 50 parts of the quartenary ammonium salt, 25 parts of methyl methacrylate and 25 parts of n butyl methacrylate.

COMPARATIVE EXAMPLE 3

The procedure of Example 17 was repeated, except that the dispersion applied consisted of 20 parts of the acryl type copolymer and 10 parts of calcium carbonate with 70 parts of a 50/50 mixture of methanol/methylethyl ketone, the acryl type copolymer consisting of 5 parts by weight of the quartenary ammonium salt:

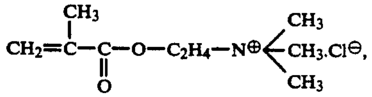

50 parts by weight of methyl methacrylate and 45 parts by weight of n butyl methacrylate.

COMPARATIVE EXAMPLE 4

The procedure of Example 10 was repeated, except that the dispersion prepared consisted of 21 parts of copolymer and 9 parts of conductive potassium titanate whiskers (Otsuka Chemical Industries, Dentall WK-300) with 70 parts of a 50/50 mixture of methanol/methylethyl ketone, the acryl type copolymer consisting of 50 parts by weight of methyl methacrylate and 50 parts by weight of n-butyl methacrylate.

COMPARATIVE EXAMPLE 5

The procedure of Example 1 was repeated, except that the applied layer consisted entirely of the following quartenary ammonium salt:

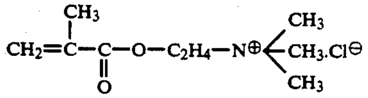

COMPARATIVE EXAMPLE 6

Using 50 $g/m^2$ high quality paper as the substrate layer, a layer of the below Composition A was applied over one surface at 5 $g/m^2$ and dried, and a layer of the below Composition B was applied over the other surface at 5 $g/m^2$.

| | |
|---|---|
| Composition A | |
| conductive zinc oxide (HakuSui Chemical Corporation, 23-K) | 100 parts |
| polyvinyl alcohol (Kurare Corporation, PVA105) | 5 parts |
| water | 145 parts |
| Composition b | |
| polyvinylbenzyltrimethyl ammonium chloride (Dow Chemical, ECR-77) | 152 parts |
| calcium carbonate (Shiraishi Industries, Whiton SB) | 100 parts |
| polyvinyl alcohol (Kurare Corporation, PVA105) | 5 parts |
| water | 195 parts |

COMPARATIVE EXAMPLE 7

The procedure of Example 20 was repeated, except that the acryl type copolymer layer was replaced with a layer of the above Composition B.

Taking the samples prepared in Examples 1 through 20, and Comparative Examples 1 through 7, an image recording layer, which must be layered over the conductive layer 2, consisting of:

| | |
|---|---|
| n-butyl methacrylate-methyl methacrylate 50:50 copolymer (molecular weight about 100,000, 40% toluene solution) | 100 parts |
| calcium carbonate | 40 parts |
| toluene | 180 parts |

at 5 g/$m^2$, and the printing quality and water resistance of the electrostatic recording media thus prepared was assessed as described below, the results of which are shown in Table 1.

1. Printing Assessment

Using a color electrostatic plotter (versatec, CE3436), prints were obtained at 30° C. and 30% RH, 20° C. and 60% RH, and 30° C. and 80% RH, after which printing density of each was measured using a reflection densiometer (MacBeth, RD-514). In the following Table 1, those prints which were found to be without defects are indicated with an "0", whereas those found to have one or more defects are indicated with an "X".

2. Water Resistance Test

Each of the above prints was submersed in water for 24 hours, whereupon each was assessed for water damage. Those found to have water damage such as swelling or separation of layers are indicated with an "X" in Table 1, whereas those without defects are indicated with an "O".

As can be seen in Table 1, the electrostatic recording media in accordance with the present·invention demonstrated remarkable printing quality and resistance to water damage.

Again using samples prepared in Examples 1 through 20, and Comparative Examples 1 through 7, flat flat plate printing blanks were prepared by applying a 15 μm thick photosensitive layer to each consisting of:

| | |
|---|---|
| n-butyl methacrylate-acrylic acid-styrene 8:1:1 copolymer | 130 parts |
| zinc oxide (Sakai Chemical Industries, Sazex #2000) | 40 parts |
| toluene | 200 parts |
| sensitizer (rose bengal) | 0.1 parts |

Thus prepared, the flat plate printing blanks were tested for water resistance by immersion in water for 24 hours. Again, the media in accordance with the present invention was found to demonstrate excellent resistance to water damage. Additionally, flat plate printing blanks prepared from each sample were then utilized in a flat plate printing process under the conditions listed below, each developed and etched blank used to continuously print 5000 sheets.

Printing Conditions plate preparation—prepared using an Aerofax PC 301W (Iwasaki Communication Equipment);

desensitizing oil application—commercially available desensitizing oil preparation (Tomoegawa Paper, H-88) used with etching processor (Ricoh) for one pass desensitization;

wet processing—untreated tap water used; and printing device—offset printing device (Ryobi, 2800 CD) used.

The quality of 5000 sheets obtained by the process above were then examined to assess the quality of each printing blank, whereupon the blanks prepared using the conductive substrate of the present invention were found to provide uniformly superior results.

TABLE 1

| | Image Evaluation | | | | | | |
|---|---|---|---|---|---|---|---|
| | 30° C. 30% RH | | 20° C. 60% RH | | 30° C. 80% RH | | |
| | Image Density | Image Quality | Image Density | Image Quality | Image Density | Image Quality | Water Resistance Test |
| Example 1 | 1.05 | O | 1.38 | O | 1.07 | O | O |
| Example 2 | 0.98 | O | 1.35 | O | 1.09 | O | O |
| Example 3 | 1.06 | O | 1.35 | O | 1.00 | O | O |
| Example 4 | 1.03 | O | 1.37 | O | 1.02 | O | O |
| Example 5 | 1.00 | O | 1.38 | O | 1.05 | O | O |
| Example 6 | 1.04 | O | 1.36 | O | 1.07 | O | O |
| Example 7 | 1.00 | O | 1.38 | O | 0.96 | O | O |
| Example 8 | 0.94 | O | 1.31 | O | 1.13 | O | O |
| Example 9 | 1.02 | O | 1.29 | O | 1.18 | O | O |
| Example 10 | 1.05 | O | 1.38 | O | 1.07 | O | O |
| Example 11 | 0.98 | O | 1.35 | O | 1.09 | O | O |
| Example 12 | 1.06 | O | 1.35 | O | 1.00 | O | O |
| Example 13 | 1.03 | O | 1.37 | O | 1.02 | O | O |
| Example 14 | 1.00 | O | 1.38 | O | 1.05 | O | O |
| Example 15 | 1.04 | O | 1.36 | O | 1.07 | O | O |
| Example 16 | 1.00 | O | 1.38 | O | 0.96 | O | O |
| Example 17 | 1.02 | O | 1.29 | O | 1.18 | O | O |
| Example 18 | 1.07 | O | 1.38 | O | 1.07 | O | O |
| Example 19 | 1.06 | O | 1.35 | O | 1.09 | O | O |
| Example 20 | 1.06 | O | 1.37 | O | 1.08 | O | O |
| Comparative 1 | 0.25 | X | 0.46 | X | 0.54 | X | O |
| Comparative 2 | 1.07 | O | 1.36 | O | 0.73 | X | X |
| Comparative 3 | 0.25 | X | 0.46 | X | 0.54 | X | O |
| Comparative 4 | 1.02 | X | 1.28 | X | 0.97 | X | O |
| Comparative 5 | 1.00 | O | 0.57 | X | 0.20 | X | X |
| Comparative 6 | 1.02 | O | 1.28 | O | 0.97 | O | X |
| Comparative 7 | 1.04 | O | 1.25 | O | 0.94 | O | X |

What is claimed is:

1. A conductive substrate including a substrate layer having at least one surface including a conductive layer formed thereover, the conductive layer having acryl copolymer as a principle component, wherein the acryl copolymer is formed from:

a) polymerizable vinyl monomer shown in the chemical structural diagram 1 in an amount of 10 to 45% by weight of said acryl copolymer; and b) at least one other polymerizable vinyl monomer,

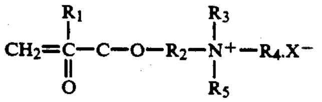

such that in chemical structural diagram 1, $R_1$ represents a hydrogen or a methyl group, $R_2$ represents an alkylene group, $R_3$, $R_4$, and $R_5$ represent benzyl groups or one to four carbon atom alkyl groups, and X represents chlorine, bromine, $CH_3SO_4$ or $C_2H_5SO_4$.

2. A conductive substrate in accordance with claim 1, wherein said conductive layer further includes conductive whiskers.

3. A conductive substrate in accordance with claim 2, wherein said whiskers are selected from the group consisting of potassium titanate, silicon carbonate, and aluminum borate, and said whiskers are doped with one selected from the group comprising tin oxide, antimony oxide, gold, and silver.

4. A conductive substrate in accordance with claim 2 or 3, wherein said whiskers are included in said electronic conductive layer within the range of 15 to 150 parts by weight of said conductive whiskers to 100 parts by weight of said acryl copolymer.

5. A conductive substrate including a substrate layer having:

a) an electrically conductive layer formed over one surface thereof, said electrically conductive layer having as principle components thereof electrically conductive particulate material and binding resin; and b) a conductive layer formed over another surface thereof, said conductive layer having acryl copolymer as a principle component thereof, said acryl copolymer is formed from:

i) polymerizable vinyl monomer shown in the chemical structural diagram 1 in an amount of 10 to 45% by weight of said acryl copolymer; and b) at least one other polymerizable vinyl monomer,

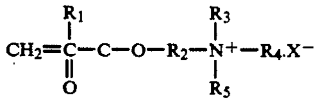
(1)

such that in chemical structural diagram 1, $R_1$ represents hydrogen or a methyl group $R_2$ represents an alkylene group, $R_3$, $R_4$, and $R_5$ represent benzyl groups or one to four carbon atom alkyl groups, and X represents chlorine, bromine, $CH_3SO_4$ or $C_2H_5SO_4$.

6. A conductive substrate including a substrate layer having:

a) an electrically conductive layer formed over a surface thereof, said electrically conductive layer having as principle components thereof electrically conducive particulate material and binding resin; and b) a conductive layer successively formed over said electrically conductive layer, said conductive layer having acryl copolymer as a principle component thereof, said acryl copolymer formed from:

i) polymerizable vinyl monomer shown in the chemical structural diagram 1 in an amount of 10 to 45% by weight of said acryl copolymer; and b) at least one other polymerizable vinyl monomer,

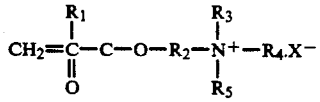

such that in chemical structural diagram 1, $R_1$ represents hydrogen or a methyl group, $R_2$ represents an alkylene group, $R_3$, $R_4$, and $R_5$ represents benzyl groups or one to four carbon atom alkyl groups, and X represents chlorine, bromine, $CH_3SO_4$ or $C_2H_5SO_4$.

7. A conductive substrate in accordance with claim 5 or 6, wherein said electrically conductive particulate material is selected from carbon black, graphite, tin oxide, titanium oxide, zinc oxide, antimony oxide, gold, silver and copper and nickel in powdered form, cationic high molecular weight electrolyte substances, anionic high molecular weight electrolyte substances, and conductive whiskers, and wherein said binding resin is selected from polyesters, polycarbonates, polyamide, polyurethane, (meth)acrylate resin, styrene resins, butyral resins, and fluorocarbon resins.

8. A recording medium comprised of a substrate layer with at least one surface thereof having a conductive layer and an image recording layer successively formed thereover, the conductive layer having acryl copolymer as a principle component thereof, the acryl copolymer formed from:

a) polymerizable vinyl monomer shown in the chemical structural diagram 1 in an amount of 10 to 45% by weight of said acryl copolymer; and b) at least one other polymerizable vinyl monomer,

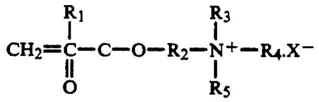
(1)

such that in chemical structural diagram 1, $R_1$ represents hydrogen or a methyl group, $R_2$ represents an alkylene group, $R_3$, $R_4$, and $R_5$ represent benzyl groups or one to four carbon atom alkyl groups, and X represents chlorine, bromine, $CH_3SO_4$ or $C_2H_5SO_4$.

9. A recording medium in accordance with claim 8, wherein said conductive layer further includes conductive whiskers.

10. A recording medium including a substrate layer having:

a) an electrically conductive layer formed over one surface thereof, said electrically conductive layer having as principle components thereof electrically conductive particulate material and binding resin; and b) a conductive layer and image recording layer successively formed over another surface thereof, said conductive layer having acryl copolymer as a principle component thereof, said acryl copolymer is formed from:

i) polymerizable vinyl monomer shown in the chemical structural diagram 1 in an amount of 10 to 45% by weight of said acryl copolymer; and b) at least one other polymerizable vinyl monomer,

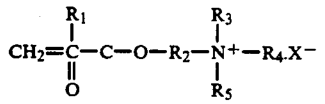

(1)

such that in chemical structural diagram 1, $R_1$ represents hydrogen or a methyl group, $R_2$ represents an alkylene group, $R_3$, $R_4$, and $R_5$ represent benzyl groups or one to four carbon atom alkyl groups, and X represents chlorine, bromine, $CH_3SO_4$ or $C_2H_5SO_4$.

11. A recording medium including a substrate layer having:

a) an electrically conductive layer formed over a surface thereof, said electrically conductive layer having a as principle components thereof electrically conductive powder and binding resin; and b) a second conductive layer and an image recording layer successively formed over said electrically conductive layer, said second conductive layer having acryl copolymer as a principle component thereof, said acryl copolymer is formed from:

i) polymerizable vinyl monomer shown in the chemical structural diagram 1 in an amount of 10 to 45% by weight of said acryl copolymer; and b) at least one other polymerizable vinyl monomer,

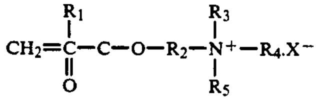

(1)

such that in chemical structural diagram 1, $R_1$ represents hydrogen or a methyl group, $R_2$ represents an alkylene group, $R_3$, $R_4$, and $R_5$ represent benzyl groups or one to four carbon atom alkyl groups, and X represents chlorine, bromine, $CH_3SO_4$ or $C_2H_5SO_4$.

12. A recording medium in accordance with any one of claims 8–11, wherein said recording medium is an electrostatic recording medium.

13. A recording medium in accordance with claim 12, wherein said image recording layer comprises materials including various types of organic solvent soluble high resistance resin compound selected from the group consisting of polyester, polycarbonate, polyamide, polyurethane, (meth)acrylate resins, styrene resins, butyral resins, olefin resins, silicon resin, and fluorocarbon resins.

14. A conductive substrate in accordance with claim 1, wherein said polymerizable vinyl monomer is the chemical compound of formula:

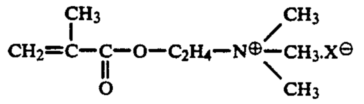

wherein X represents chlorine, bromine, $CH_3SO_4$ or $C_2H_5SO_4$.

15. A conductive substrate in accordance with claim 14, wherein said other polymerizable vinyl monomer is selected from the group consisting of alkyl (meth)acrylates such as methyl (meth)acrylate, ethyl (meth)acrylate, isobutyl (meth)acrylate, n-butyl (meth)acrylate, 2-ethylbenzyl (meth)acrylate, n-butyl (meth)acrylate, hexyl (meth)acryl amide; acrylonitrile; vinyl acetate; styrene; α-methyl styrene; and vinyl toluene.

16. A conductive substrate in accordance with claim 5 or 6, wherein said polymerizable vinyl monomer is employed in the amount of 25 to 40% by weight of said acryl copolymer.

* * * * *

UNITED STATES PATENT AND TRADEMARK OFFICE

CERTIFICATE OF CORRECTION

PATENT NO. : 5,234,746 Page 1 of 3

DATED : August 10, 1993

INVENTOR(S) : Kiyoshi IWAMOTO et al.

It is certified that error appears in the above-indentified patent and that said Letters Patent is hereby corrected as shown below:

Claim 6, column 14, line 1, change "conducive" to --conductive--.

Claim 11, column 15, line 25, delete "a".

Claim 1, column 13, lines 11-15, change " 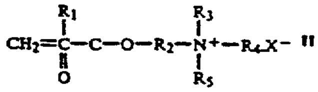 "

to -- 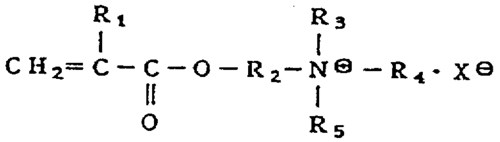 (1)--.

Claim 5, column 13, lines 52-56, change " 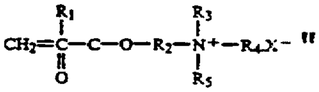 "

to -- 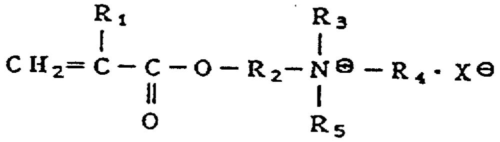 (1)--.

UNITED STATES PATENT AND TRADEMARK OFFICE

CERTIFICATE OF CORRECTION

PATENT NO. : 5,234,746

DATED : August 10, 1993

INVENTOR(S) : Kiyoshi IWAMOTO et al.

It is certified that error appears in the above-indentified patent and that said Letters Patent is hereby corrected as shown below:

Claim 6, column 14, lines 11-15, change " 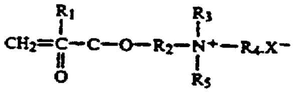 "

to -- 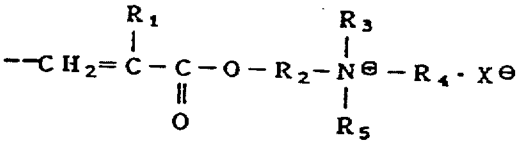 (1)--.

Claim 8, column 14, lines 46-50, change " 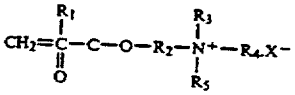 "

to -- 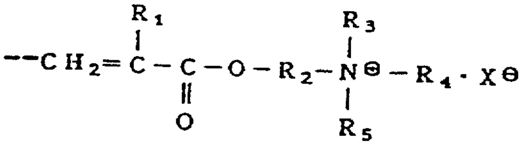 (1)--.

Claim 10, column 15, lines 9-13, change " 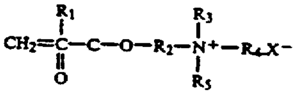 "

to -- 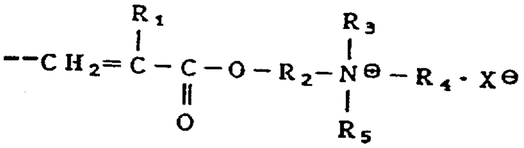 (1)--.

UNITED STATES PATENT AND TRADEMARK OFFICE
CERTIFICATE OF CORRECTION

PATENT NO. : 5,234,746

DATED : August 10, 1993

INVENTOR(S) : Kiyoshi IWAMOTO et al.

It is certified that error appears in the above-indentified patent and that said Letters Patent is hereby corrected as shown below:

Claim 11, column 15, lines 36-40, change "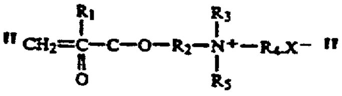"

to --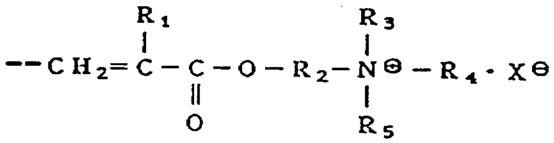 (1)--.

Signed and Sealed this

Eighth Day of November, 1994

Attest:

BRUCE LEHMAN

Attesting Officer

*Commissioner of Patents and Trademarks*